US006233300B1

(12) United States Patent
Dalke

(10) Patent No.: US 6,233,300 B1
(45) Date of Patent: May 15, 2001

(54) CONICAL SHAPED SEISMIC GUIDE PINS AND MATING OPENINGS

(75) Inventor: Charles Arthur Dalke, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/212,756

(22) Filed: Dec. 16, 1998

(51) Int. Cl.$^7$ .............................. G21C 13/32; G21C 13/04
(52) U.S. Cl. ........................ 376/285; 376/287; 376/289; 376/294
(58) Field of Search .................................. 376/294, 287, 376/288, 263, 285

(56) References Cited

U.S. PATENT DOCUMENTS

| 4,096,034 | * | 6/1978 | Anthony . | |
|---|---|---|---|---|
| 4,100,021 | * | 7/1978 | Silverblatt . | |
| 4,192,716 | * | 3/1980 | Anthony . | |
| 4,818,476 | * | 4/1989 | Gasparro | 376/294 |
| 5,325,407 | * | 6/1994 | Forsyth et al. | 376/205 |
| 5,675,619 | * | 10/1997 | Erbes et al. . | |
| 5,797,228 | * | 8/1998 | Kemeny . | |

* cited by examiner

Primary Examiner—Charles T. Jordan
Assistant Examiner—Kyongtack K. Mun
(74) Attorney, Agent, or Firm—Armstrong Teasdale LLP

(57) ABSTRACT

A top guide to shroud head interface is described. In one embodiment, the interface includes a top guide that includes a flange that is configured to engage a corresponding flange of the shroud head. The top guide flange includes a plurality of frusto-conical shaped guide pins extending from the top surface of the flange. The shroud head flange includes a plurality of guide pin openings configured to align with the guide pins located on the top guide flange. Each guide pin opening includes a frusto-conical portion that extends through the flange from the bottom surface of the shroud head flange and has a slope equal to the slope of the frusto-conical pins. Each guide pin opening also includes a cylindrical portion that extends from the small base of the frusto-conical portion of the guide pin opening to the top surface of the shroud head flange. The diameter of the frusto-conical guide pin opening at the bottom surface of the shroud head flange is configured to be larger than the diameter of the frusto-conical guide pin immediately adjacent the top surface of the top guide flange. The frusto-conical guide pins and guide pin openings provide for suitable clearances between the guide pins and the guide pin openings to accommodate any flexing of the shroud head flange during installation.

22 Claims, 3 Drawing Sheets

US 6,233,300 B1

CONICAL SHAPED SEISMIC GUIDE PINS AND MATING OPENINGS

BACKGROUND OF THE INVENTION

This invention relates generally to nuclear reactors and more particularly, to guide pins located between the shroud head flanges and the top guide in a boiling water reactor.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core plate and is supported by a shroud support structure. Particularly, the shroud has a generally cylindrical shape and surrounds both the core plate and the top guide. The core center axis is substantially coaxial with the center axis of the shroud, and the shroud is open at both ends so that water can flow up through the lower end of the shroud and out through the upper end of the shroud. The shroud, top guide, and core plate limit lateral movement of the core fuel bundles.

The upper portion of the shroud, commonly referred to as the shroud head, is coupled to the top guide. Particularly, the shroud head flange mates with the top guide flange. The top guide flange typically includes cylindrically shaped guide/shear pins, and the shroud head flange includes corresponding cylindrically shaped mating holes. The purpose of the guide pins is to align the shroud head in the proper position during assembly of the reactor. Additionally the pins provide support and rigidity to the structure during a seismic event. Typically small clearances between the pins and their corresponding mating holes minimize the impact loading on the pins and flange holes caused by horizontal seismic accelerations. The small clearances make routine refueling assembly and disassembly operations difficult.

During assembly, the shroud head is typically suspended from an overhead crane and lowered into mating position with the top guide flange. Because of the large size and weight of the shroud head, the shroud head flange may flex between the lifting points. The flexing of the shroud head flange may cause the cylindrical holes to become misaligned with the guide pins on the top guide flange. The misalignment causes an interference condition which may not allow the top guide flange and the shroud head flange to mate properly.

It would be desirable to provide a shroud head and a top guide that include corresponding mating guide pins and flange holes that have a suitable clearance to accommodate any flexing of the shroud head flange during assembly. It would also be desirable to provide a shroud head and a top guide that include corresponding mating guide pins and flange holes that have small clearances after assembly to minimize the impact loading on the alignment pins and flange holes caused by horizontal seismic accelerations during a seismic event.

BRIEF SUMMARY OF THE INVENTION

These and other objects may be attained by a top guide to shroud head interface that in one embodiment includes a top guide having a plurality of frusto-conical shaped alignment/guide pins and a shroud head having a plurality of corresponding guide pin openings. Each guide pin opening is configured to receive a frusto-conical guide pin.

The top guide includes a flange that is configured to engage a corresponding flange of the shroud head. The top guide flange includes a plurality of frusto-conical shaped guide pins extending from the top surface of the flange. The guide pins are located around the circumference of the top guide flange.

The shroud head flange includes a plurality of guide pin openings configured to align with the guide pins located on the top guide flange. Each guide pin opening includes a frusto-conical portion that extends through the flange from the bottom surface of the shroud head flange and has a slope equal to the slope of the frusto-conical pins. Each guide pin opening also includes a cylindrical portion that extends from the small base of the frusto-conical portion of the guide pin opening to the top surface of the shroud head flange. The diameter of the frusto-conical guide pin opening at the bottom surface of the shroud head flange is configured to be larger than the diameter of the base of the frusto-conical guide pin immediately adjacent the top surface of the top guide flange.

During assembly, the shroud head is suspended from an overhead crane and lowered into engagement with the top guide flange. Particularly, the shroud head is lowered so that the guide pin openings in the shroud head flange align with the frusto-conical guide pins extending from the top guide flange. The shroud head is lowered until the bottom surface of the shroud head flange is in surface to surface contact with the top surface of the top guide flange. The conical shape of the guide pins and the conical shape of the guide pin openings provide greater clearance between the pin and the side wall of the opening as the two flanges approach engagement than the clearance when the guide pins are cylindrically shaped. In the assembled condition, there is less than about 1.0 millimeters of clearance between the pin and the opening side wall. At a position where the distance between the two flanges is equal to the height of the guide pins, the clearance between the guide pins and the opening is about 4.0 millimeters when the cone angle of the guide pins is 60 degrees.

The above described top guide to shroud head interface includes frusto-conical guide pins and guide pin openings that provide for suitable clearances between the guide pins and the guide pin openings to accommodate flexing of the shroud head flange during installation. Additionally, the frusto-conical guide pins and guide pin openings provide less than 1.0 millimeter of clearance in the installed position to minimize the impact loading on the guide pins and openings caused by horizontal seismic accelerations during a seismic event.

DETAILED DESCRIPTION OF THE INVENTION

Figure 1:
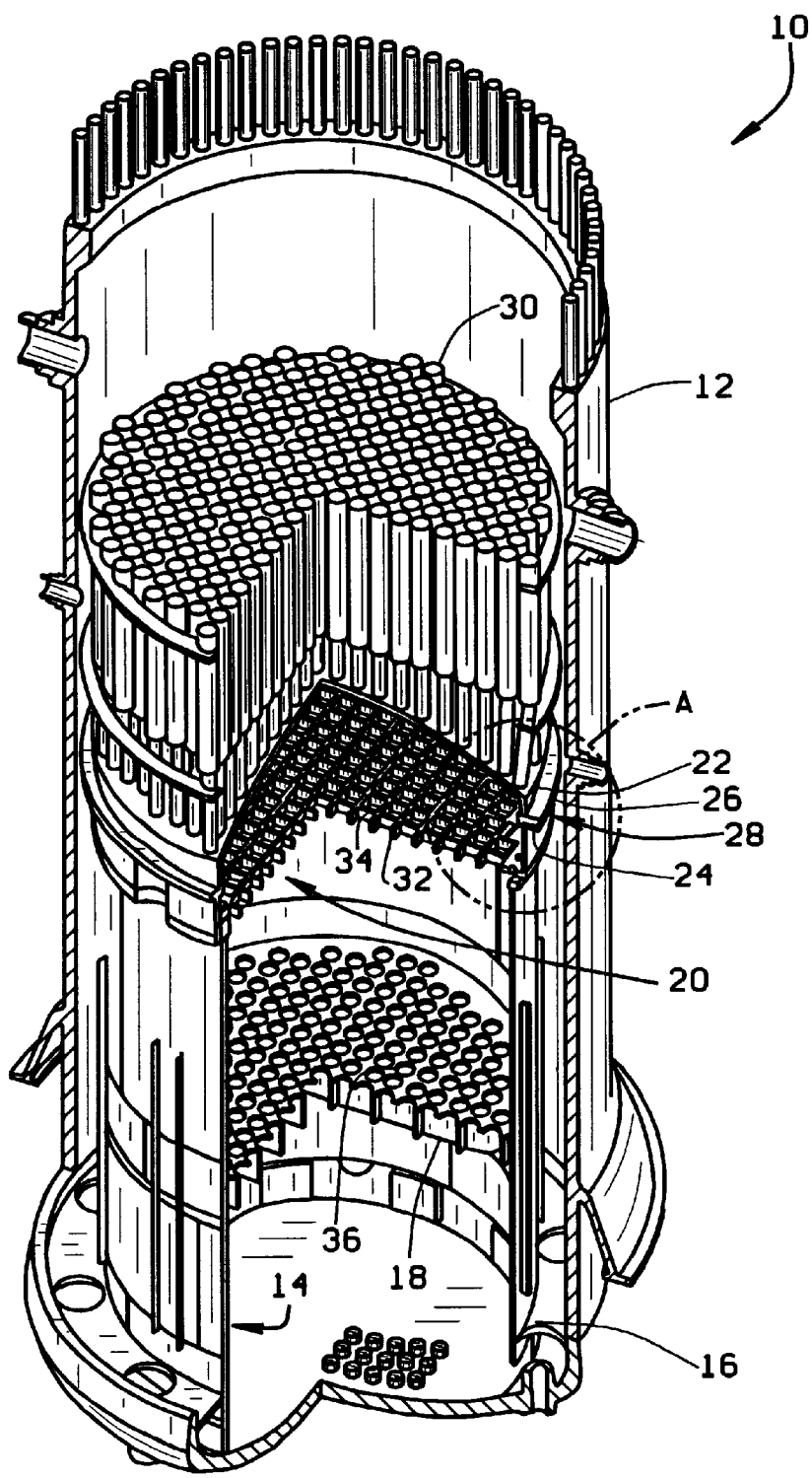
FIG. 1 is a sectional view with parts cut away of a reaction pressure vessel including a top guide to shroud head interface in accordance with an embodiment of the present invention.

FIG. 1 is a sectional view with parts cut away of a nuclear reactor pressure vessel (RPV) 10. RPV 10 includes a generally cylindrical side wall 12. A core shroud 14 of generally cylindrical shape is located within RPV 10 and surrounds the reactor core (not shown). Shroud 14 is supported by a shroud support structure 16. A core plate 18 is spaced below a top guide 20 within RPV 10. Core plate 18 and top guide 20 are coupled to shroud 14. Shroud 14 includes a shroud head 22 coupled to top guide 20. Particularly, top guide 20 includes a flange 24 and shroud head 22 includes a flange 26 configured to engage top guide flange 24. More particularly, top guide flange 24 engages shroud head flange 26 to form a shroud head to top guide interface 28.

RPV 10 is shown in FIG. 1 as being shut down with many components removed. For example, and in operation, many fuel bundles and control rods (not shown) are located in the area between top guide 20 and core plate 18. In addition, and in operation, steam dryers and many other components (not shown) are located in the area above top guide 20. Also, steam separators 30 are permanently coupled to shroud head 22.

Top guide 20 is a latticed structure including a plurality of top guide beams 32 defining top guide openings 34. Core plate 18 includes a plurality of openings 36 which are substantially aligned with top guide openings 34 to facilitate positioning the fuel bundles between top guide 20 and core plate 18. Fuel bundles are inserted into the area between top guide 20 and core plate 18 by utilizing top guide openings 34 and core plate openings 36. Particularly, four fuel bundles are inserted through a top guide opening 34, and are supported horizontally by an orificed fuel support (not shown) inserted in core plate opening 36, core plate 18, and top guide beams 32. Shroud 14, core plate 18, and top guide 20 limit lateral movement of the core fuel bundles.

Figure 2:
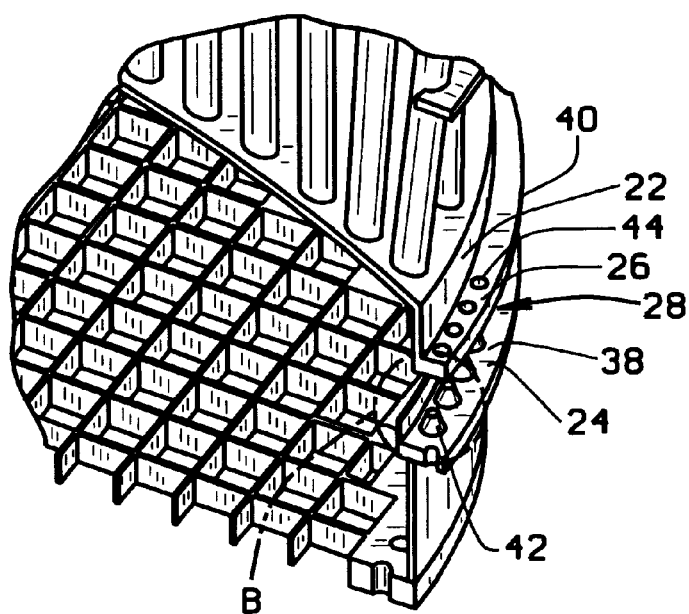
FIG. 2 is an enlarged exploded view of section A of the shroud head to top guide interface shown in FIG. 1.

FIG. 2 is an enlarged exploded view of section A of shroud head to top guide interface 28 shown in FIG. 1. Interface 28 is formed by a top surface 38 of top guide flange 24 and a bottom surface 40 of shroud head flange 26. Top guide flange 24 includes a plurality of frusto-conical shaped guide pins 42 extending from top surface 38. Guide pins 42 are located around the circumference of top guide flange 24.

Shroud head flange 26 includes a plurality of corresponding guide pin openings 44 extending from shroud head flange bottom surface 40 through shroud head flange 26. Each guide pin opening 44 is configured to receive a frusto-conical guide pin 42.

Figure 3:
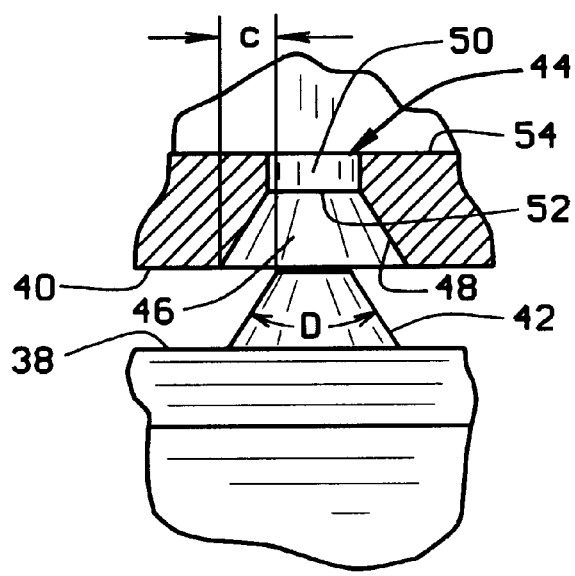
FIG. 3 is an enlarged exploded sectional view of section B of the shroud head to top guide interface shown in FIG. 2.
Figure 4:
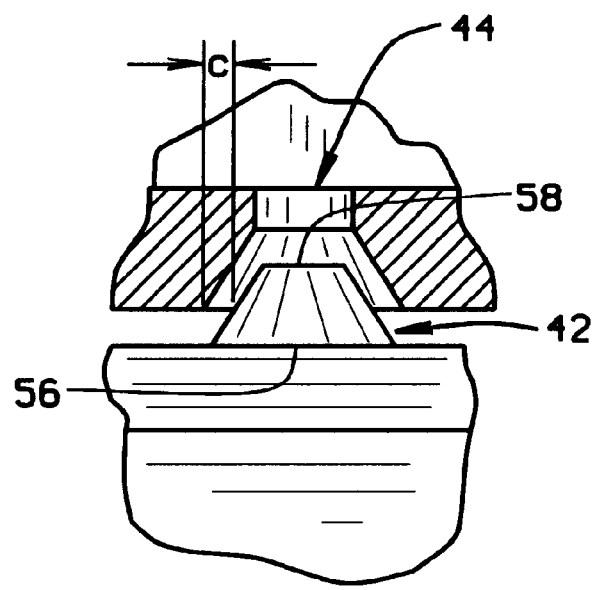
FIG. 4 is an enlarged exploded sectional view of section B of the shroud head to top guide interface shown in FIG. 2.
Figure 5:
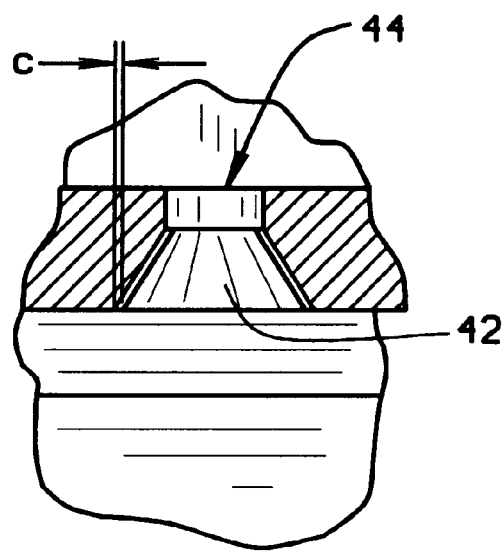
FIG. 5 is an enlarged exploded sectional view of section B of the shroud head to top guide interface shown in FIG. 2.

FIGS. 3, 4, and 5 are enlarged exploded sectional views of section B of the shroud head to top guide interface shown in FIG. 2 and illustrate various positions of shroud head flange 26 in relation to top guide flange 24 during assembly.

As described above, shroud head flange 26 includes a plurality of guide pin openings 44 configured to align with guide pins 42 located on top guide flange 24. Each guide pin opening 44 includes a frusto-conical portion 46, defined by an inside surface 48 of shroud head flange 26, that extends through shroud head flange 26 from bottom surface 40 and has a slope equal to the slope of frusto-conical guide pins 42. Each guide pin opening 44 also includes a cylindrical portion 50 that extends from the small base 52 of frusto-conical portion 46 of guide pin opening 44 to a top surface 54 of shroud head flange 26. The diameter of frusto-conical guide pin opening 44 at bottom surface 40 of shroud head flange 26 is configured to be larger than the diameter of frusto-conical guide pin 42 immediately adjacent top surface 38 of top guide flange 24. Because of the frusto-conical shape, guide pins 42 include a first base 56 and a second base 58, with first base 56 having a larger diameter than second base 58. Second base 58 is located immediately adjacent top surface 38 of top flange 24.

During assembly, shroud head 22 is suspended from an overhead crane and lowered into engagement with top guide flange 24. Particularly, shroud head 22 is lowered so that each frusto-conical guide pin 42 extending from top guide flange 24 aligns with a corresponding guide pin opening 44 in shroud head flange 26. Shroud head 22 is lowered until bottom surface 40 of shroud head flange 26 is in surface to surface contact with top surface 38 of top guide flange 24. The conical shape of guide pins 42 and the conical shape of guide pin openings 44 provide greater clearance between guide pin 42 and guide pin opening 44 as shroud head flange 26 and top guide flange 24 approach engagement than the clearance when the guide pins are cylindrically shaped.

In the assembled condition, a distance C between guide pin 42 and guide pin opening 44 is less than about 1.0 millimeters (see FIG. 5). At a position where the distance between the two flanges 24 and 26 is equal to the height of guide pins 44, distance C between each guide pin 42 and each guide pin opening 44 is about 4.0 millimeters when a cone angle D of guide pin 42 is 60 degrees (see FIG. 3). Cone angle D is measured in reference to first base 56 of guide pin 42. Of course, distance C is dependent on the value of cone angle D and the relative position of shroud head flange 26 and top guide flange 24. For example, at an intermediate position shown in FIG. 4, distance C is about 2.3 millimeters for a cone angle D of 60 degrees. Cone angle D may vary over a wide range, for example from about 20 to about 80 degrees. Preferably, cone angle D is about 40 to about 75 degrees, more preferably about 55 to about 65 degrees. If cone angle D is too high the conical shape of guide pin 42 approaches that of a cylinder and may not overcome the inherent alignment problems of a cylindrical guide pin. If cone angle D is too low, guide pin 42 may not provide sufficient restriction of horizontal movement during a seismic event.

The above described top guide to shroud head interface 28 includes frusto-conical guide pins 42 and guide pin openings 44 that provide for suitable clearances between guide pins 42 and guide pin openings 44 to accommodate flexing of shroud head flange 26 during installation. Additionally, frusto-conical guide pins 42 and guide pin openings 44 provide less than 1.0 millimeter of clearance in the installed position to minimize the impact loading on guide pins 42 and openings 44 caused by horizontal seismic accelerations during a seismic event.

In an alternate embodiment, guide pin openings 44 do not extend through shroud head flange 26. In this embodiment, each guide pin opening 44 includes frusto-conical portion 46 configured to receive a guide pin 42, but does not include cylindrical portion 50.

In another embodiment, guide pins 42 extend from shroud head flange 26 instead of top guide flange 24. In this embodiment, corresponding guide pin openings 44 are located in top guide flange 34.

In still another embodiment, some guide pins 42 extend from top guide flange 24 and some guide pins 42 extend from shroud head flange 26. Additionally, each guide pin 42 has a corresponding guide pin opening 44 located in the opposing flange. Particularly, each guide pin 42 extending from top guide flange 26 has a corresponding guide pin opening located in shroud head flange 26, and each guide pin 42 extending from shroud head flange 26 has a corresponding guide pin opening 44 located in top guide 24.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A shroud head to top guide interface in a nuclear reactor comprising a top guide flange, and a shroud head flange configured to couple to said top guide flange, said top guide flange comprising a plurality of frusto-conical shaped guide pins extending from a top surface of said top guide flange, each said frusto-conical guide pin comprising a first base and a second base, said first base having a larger diameter than said second base, said first base of said frusto-conical guide pins located adjacent said top surface of said top guide flange, said shroud head flange comprising a plurality of guide pin openings, each said guide pin opening comprising a frusto-conical shaped portion configured to receive a corresponding frusto-conical shaped guide pin.

2. An interface in accordance with claim 1 wherein a bottom surface of said shroud head flange is in surface to surface contact with said top surface of said top guide flange.

3. An interface in accordance with claim 2 wherein each guide pin opening is defined by an inside surface of said shroud head flange, each said inside surface defining said guide pin opening comprises a frusto-conical portion, said frusto-conical portion opening includes a large base and a small base, and extends from said bottom surface of said shroud head flange.

4. An interface in accordance with claim 3 wherein each guide pin opening further comprises a cylindrical portion, said cylindrical portion extending from said small base of said frusto-conical portion to a top surface of said shroud head flange.

5. An interface in accordance with claim 3 wherein a slope of said inside surface of said shroud head flange defining each said guide pin opening is configured to be equal to a slope of said frusto-conical guide pins.

6. An interface in accordance with claim 5 wherein a diameter of said large base of each said guide pin opening is configured to be larger than a diameter of said large base of each said frusto-conical guide pin so that there is a clearance of less than about 1.0 millimeter between each said inside surface of said shroud head defining said guide pin opening and each said guide pin when the shroud head flange is positioned in surface to surface contact with said top guide flange.

7. An interface in accordance with claim 5 wherein a diameter of said large base of each said guide pin opening is configured to be larger than a diameter of said large base of each said frusto-conical guide pin so that there is a clearance of less than about 0.8 millimeter between each said inside surface of said shroud head defining said guide pin opening and each said guide pin when the shroud head flange is positioned in surface to surface contact with said top guide flange.

8. An interface in accordance with claim 5 wherein each said frusto-conical guide pin comprises a cone angle of between about 20 to 80 degrees.

9. An interface in accordance with claim 8 wherein each said frusto-conical guide pin comprises a cone angle of between about 55 to 65 degrees.

10. A shroud for a nuclear reactor comprising a top guide and a shroud head, said top guide comprising a flange, said shroud head comprising a flange configured to couple to said top guide flange, said top guide flange comprising a plurality of frusto-conical shaped guide pins extending from a top surface of said top guide flange, each said frusto-conical guide pin comprising a first base and a second base, said first base having a larger diameter than said second base, said first base of said frusto-conical guide pins located adjacent said top surface of said top guide flange, said shroud head flange comprising a plurality of guide pin openings, each said guide pin opening comprising a frusto-conical shaped portion configured to receive a corresponding frusto-conical shaped guide pin.

11. A shroud in accordance with claim 10 wherein a bottom surface of said shroud head flange is in surface to surface contact with said top surface of said top guide flange.

12. A shroud in accordance with claim 11 wherein each guide pin opening is defined by an inside surface of said shroud head flange, each said inside surface defining said guide pin opening comprises a frusto-conical portion, said frusto-conical portion includes a large base and a small base, and extends from said bottom surface of said shroud head flange.

13. A shroud in accordance with claim 12 wherein each guide pin opening further comprises a cylindrical portion, said cylindrical portion extending from said small base of said frusto-conical portion to a top surface of said shroud head flange.

14. A shroud in accordance with claim 12 wherein a slope of said inside surface of said shroud head flange defining each said guide pin opening is configured to be equal to a slope of said frusto-conical guide pins.

15. A shroud in accordance with claim 14 wherein a diameter of said large base of each said guide pin opening is configured to be larger than a diameter of said large base of each said frusto-conical guide pin so that there is a clearance of less than about 1.0 millimeter between each said inside surface of said shroud head defining said guide pin opening and each said guide pin when the shroud head flange is positioned in surface to surface contact with said top guide flange.

16. A shroud in accordance with claim 14 wherein a diameter of said large base of each said guide pin opening is configured to be larger than a diameter of said large base of each said frusto-conical guide pin so that there is a clearance of less than about 0.8 millimeter between each said inside surface of said shroud head defining said guide pin opening and each said guide pin when the shroud head flange is positioned in surface to surface contact with said top guide flange.

17. A shroud in accordance with claim 14 wherein each said frusto-conical guide pin comprises a cone angle of between about 20 to 80 degrees.

18. A shroud in accordance with claim 17 wherein each said frusto-conical guide pin comprises a cone angle of between about 55 to 65 degrees.

19. A shroud for a nuclear reactor comprising a top guide and a shroud head, said top guide comprising a flange, said shroud head comprising a flange configured to couple to said top guide flange, said shroud head flange comprising a plurality of frusto-conical shaped guide pins extending from a bottom surface of said shroud head flange, each said frusto-conical guide pin comprising a first base and a second base, said first base having a larger diameter than said second base, said first base of said frusto-conical guide pins located adjacent said bottom surface of said shroud head flange, said top guide flange comprising a plurality of guide pin openings, each said guide pin opening comprising a frusto-conical shaped portion configured to receive a corresponding frusto-conical shaped guide pin.

20. A shroud in accordance with claim 19 wherein said bottom surface of said shroud head flange is in surface to surface contact with a top surface of said top guide flange.

21. A shroud for a nuclear reactor comprising a top guide and a shroud head, said top guide comprising a flange, said shroud head comprising a flange configured to couple to said top guide flange, said top guide flange comprising a plurality of frusto-conical shaped guide pins extending from a top surface of said top guide flange, and said shroud head flange comprising a plurality of frusto-conical shaped guide pins extending from a bottom surface of said shroud head flange, each said frusto-conical guide pin comprising a first base and a second base, said first base having a larger diameter than said second base, said first base of said frusto-conical guide pins extending from said shroud head flange located adjacent said bottom surface of said shroud head flange, said first base of said frusto-conical guide pins extending from said top guide flange located adjacent said top surface of said top guide flange, and said shroud head flange comprising a plurality of guide pin openings, each said guide pin opening comprising a frusto-conical shaped portion configured to receive a corresponding frusto-conical shaped guide pin, and said top guide flange comprising a plurality of guide pin openings, each said guide pin opening comprising a frusto-conical shaped portion configured to receive a corresponding frusto-conical shaped guide pin.

22. A shroud in accordance with claim 21 wherein said bottom surface of said shroud head flange is in surface to surface contact with said top surface of said top guide flange.

* * * * *